United States Patent [19]
Preti

[11] 3,798,641
[45] Mar. 19, 1974

[54] PROCESS AND SYSTEM FOR THE IDENTIFICATION OF A VEHICLE

[75] Inventor: Jean Preti, Clamart, France

[73] Assignee: Societe de Fabrication d'Instruments de Mesure S.F.I.A., Massy, France

[22] Filed: May 3, 1971

[21] Appl. No.: 139,431

[30] Foreign Application Priority Data
May 5, 1970 France .................... 7016383

[52] U.S. Cl. ............................ 343/6.5 SS
[51] Int. Cl. ............................ G01s 9/56
[58] Field of Search .................... 343/6.5 R, 6.5 SS

[56] References Cited
UNITED STATES PATENTS

| | | | |
|---|---|---|---|
| 3,353,178 | 11/1967 | Wastelid | 343/6.5 SS |
| 3,521,280 | 7/1970 | Janco et al. | 343/6.5 SS |
| 3,384,892 | 5/1968 | Postman | 343/6.5 SS |
| 3,406,391 | 10/1968 | Levon | 343/5.5 SS |

FOREIGN PATENTS OR APPLICATIONS

| | | | |
|---|---|---|---|
| 1,514,341 | 2/1968 | France | 343/6.5 SS |
| 1,517,371 | 3/1968 | France | |

*Primary Examiner*—Stephen C. Bentley
*Attorney, Agent, or Firm*—Breitenfeld & Levine

[57] ABSTRACT

A method and system for identifying a vehicle. An interrogation station transmits a frequency modulated continuous microwave to a vehicle having responder equipment which modulates the received microwave in accordance with an identifying binary code which is decoded at the interrogation station which receives the reflected modulated microwave. The modulation may be further frequency modulated at two different frequencies or may be modulated to give decoded pulses having different widths.

7 Claims, 1 Drawing Figure

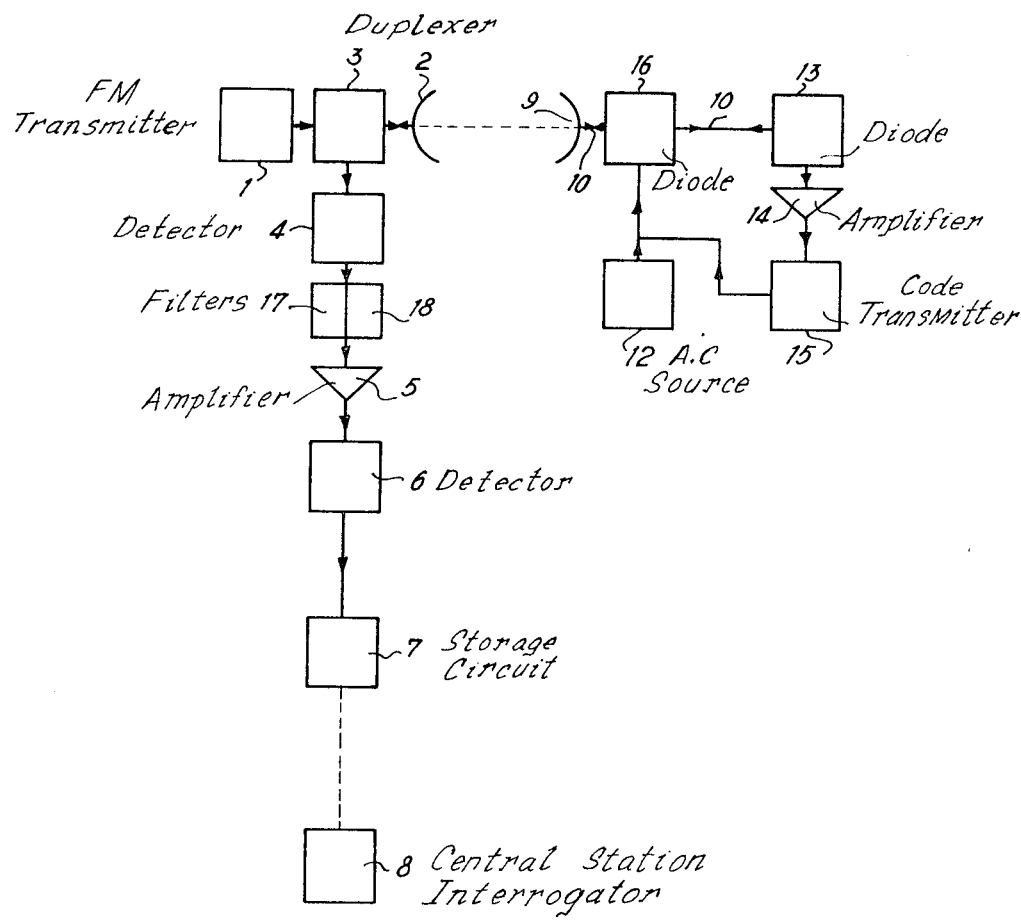

PROCESS AND SYSTEM FOR THE IDENTIFICATION OF A VEHICLE

BACKGROUND OF THE INVENTION

The present invention concerns the identification of a vehicle from an interrogation station.

It concerns more particularly the identification of vehicles capable of passing the interrogation station at a short distance from the latter, for example a distance of a few metres, which is the case more particularly of road and rail vehicles, and for this reason, the invention is preferably applied to these vehicles rather than to vehicles such as aircraft.

Identification processes are known in which the interrogation station transmits permanently a microwave towards the zone of passage of the vehicle; the vehicle receives this microwave when it passes and reflects it to the interrogation station in the form of a modulated reflected wave, this modulation comprising a coding, characteristic of the vehicle, and the interrogation station receives the modulated reflected wave and comprises means for detecting the code which it contains.

A process of this type is described for example in French Pat. Specification No. 1,517,341.

The process described in the said French Specification has the disadvantage that the wave reflected at the vehicle meets the transmitted beam, which causes the creation of a system of standing waves, resulting in an absence of reception at the interrogation station when the receiver of this station is situated at a node of the system.

This disadvantage, which is negligible when the vehicle is situated at a considerable distance from the interrogation station, as in the case of aircraft for example, is very troublesome when the vehicle passes at a few metres only from the interrogation station.

Another disadvantage of the known process is that the absence of reception may be due equally well either to an absence of signal from the responder, i.e., to the absence of a vehicle, or to an accidental interruption of the interrogator-responder link.

BRIEF SUMMARY OF THE INVENTION

According to the present invention, the wave transmitted by the interrogation station is frequency modulated, this frequency modulation of the transmitted wave being at least equal to one thousand times the modulation frequency of the reflected wave.

The system of standing waves is thus displaced artificially such that the length of stay of the interrogation station at a node of the system becomes negligible.

To remove ambiguity and permit discrimination between an accidental interruption in transmission and a normal zero signal, the present invention may use a binary code, in which the 0's and 1's are formed either by pulses modulated at two different frequencies, the receiver then comprising two filters tuned respectively to one and the other of the said different frequencies, such that the occurrence of signals at these two filters corresponds respectively to the 0 state and the 1 state, or by pulses having two different pulse widths.

BRIEF DESCRIPTION OF THE DRAWING

The single FIGURE of the accompanying drawing is a block diagram of a device embodying the present invention.

DESCRIPTION OF THE PREFERRED EMBODIMENT

The interrogation station comprises a transmitter microwave, modulated with a frequency of 100 Kcs, coupled by means of a duplexer 3 to an aerial 2, and is one of a plurality of interrogation stations.

Advantageously, the aerial is a transmitting and receiving aerial, and the duplexer has the effect of separating these two functions, as is known.

The response signals from the interrogated vehicles are picked up by this aerial and routed by the duplexer 3 to a microwave detector 4, at whose output are collected low-frequency signals containing the identification code of the interrogated vehicle.

These signals are sent to two filters 17 and 18, one tuned to a frequency $F_1$ and the other to a frequency $F_2$. For example, $F_1$ and $F_2$ are two frequencies which are at 10 percent from one another. The occurrence of signals at the output of the filters corresponds respectively to the 0 state and 1 state.

After amplification at amplification means 5 and detection at detection means 6, this code is transmitted for example to a store circuit 7. This store circuit retains the code until the store circuit is interrogated by a central station 8, which interrogates the different interrogation stations in succession.

The responder vehicle is provided with an equipment comprising an aerial 9 directed towards the interrogation station, and with which is associated a line 10, which may or may not be a waveguide line, and which is terminated by a short circuit.

In the course of its passage to the closed end of this line, the wave picked up by the aerial 9 arrives at a diode 16 through which passes a sinusoidal current of frequency 100 c/s from an appropriate source 12, the purpose of said sinusoidal current being to modulate the said wave.

The modulated wave is then collected in part by a second detection diode 13 supplying a signal, which after amplification at 14 is used for triggering the transmission of a binary code, whose zeros are formed by modulation at the frequency $F_1$ and whose 1's by modulation at the frequency $F_2$, and which is applied to the diode 16 situated in the path of the wave reflected by the said short circuit of the line and which is directed towards the aerial 9 for producing a modulation by pulses of this reflected wave, which will be transmitted by the aerial 9 to the aerial 2 of an interrogation station.

A code transmitter 15 triggered by the amplified signal of the diode 13 feeds the diode 16.

The invention is more particularly applicable to the identification of the passage of utilitarian vehicles, for example to the control of public transport vehicle traffic.

I claim:

1. In a process for the identification of a vehicle from an interrogation station, in which the interrogation station transmits a continuous microwave to a zone through which the vehicle passes, the vehicle receives this microwave when it is passing through the zone and reflects the wave to the interrogation station in the form of a modulated reflected wave, this modulation comprising a coding characteristic of the vehicle, and the interrogation station receives the modulated reflected wave and detects the code which it contains, the improvement comprising said wave transmitted by the interrogation station being frequency modulated with a modulation frequency equal at least to one thousand times the modulation frequency of the reflected wave.

2. Process as claimed in claim 1, in which the said code is a binary code formed by a succession of pulses, each pulse having one of two different widths.

3. Process as claimed in claim 1, in which the code is a binary code, and the 0's and 1's of the code are formed by modulations at two different frequencies.

4. Process as claimed in claim 3, in which the said different frequencies are at about 10 percent from one another.

5. A system for identifying a vehicle, comprising:
an interrogation station comprising a transmitter for generating a frequency modulated continuous microwave, antenna means coupled to said transmitter, detector means, and demodulating means coupled to said detector means; and
responder means on said vehicle comprising code modulation means, and means coupled to said code modulation means for receiving and supplying said continuous microwave to said code modulation means to be modulated with a periodic signal in accordance with a predetermined code characteristic of said vehicle, the modulation frequency of the continuous microwave being at least one thousand times the frequency of the periodic signal, and for returning the code modulated microwave to said interrogation station.

6. A system as claimed in claim 5, wherein said demodulating means includes two filter means tuned to respective different frequencies.

7. A system as claimed in claim 5, wherein said code modulation means is a binary code modulation means.

* * * * *